US009367725B2

(12) United States Patent  (10) Patent No.: US 9,367,725 B2
Negro et al.  (45) Date of Patent: Jun. 14, 2016

(54) METHOD AND APPARATUS FOR PERFORMING DIFFERENT DECODING ALGORITHMS IN DIFFERENT LOCATIONS

(75) Inventors: James Negro, Arlington, MA (US); Xiangyun Ye, Framingham, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 13/288,098

(22) Filed: Nov. 3, 2011

(65) Prior Publication Data

US 2013/0112752 A1    May 9, 2013

(51) Int. Cl.
*G06K 9/18*    (2006.01)
*G06K 7/14*    (2006.01)
*G06K 7/10*    (2006.01)

(52) U.S. Cl.
CPC .......... *G06K 7/1404* (2013.01); *G06K 7/10722* (2013.01); *G06K 9/18* (2013.01)

(58) Field of Classification Search
CPC ....................................................... G06K 9/18
USPC .............. 235/462.08, 462.32, 462.41, 472.01
See application file for complete search history.

(56) References Cited

U.S. PATENT DOCUMENTS

| 4,751,375 | A | 6/1988 | Ravizza |
| 4,988,852 | A | 1/1991 | Krishnan |
| 5,592,228 | A | 1/1997 | Dachiku et al. |
| 6,494,375 | B1 | 12/2002 | Ishibashi et al. |
| 6,880,758 | B2 | 4/2005 | Park et al. |
| 7,181,066 | B1 | 2/2007 | Wagman et al. |
| 7,199,385 | B2 | 4/2007 | Wehrle et al. |
| 7,270,273 | B2 * | 9/2007 | Barber et al. ............ 235/462.25 |
| 7,281,659 | B2 * | 10/2007 | Page ........................ 235/462.07 |
| 7,293,712 | B2 * | 11/2007 | Wang ....................... G06K 7/10 235/454 |
| 7,392,951 | B2 * | 7/2008 | Ray et al. .................... 235/462.2 |
| 7,545,949 | B2 | 6/2009 | Mirtich et al. |
| 7,646,887 | B2 | 1/2010 | Goncalves et al. |
| 7,721,964 | B2 | 5/2010 | Reichenbach et al. |
| 2009/0127326 | A1 * | 5/2009 | Rudeen ......................... 235/375 |
| 2010/0200660 | A1 | 8/2010 | Moed et al. |
| 2011/0075156 | A1 | 3/2011 | Patel et al. |
| 2011/0192894 | A1 * | 8/2011 | Ragnet .............. G06F 17/30011 235/375 |

* cited by examiner

*Primary Examiner* — Toan Ly
(74) *Attorney, Agent, or Firm* — Quarles & Brady LLP

(57) ABSTRACT

A method and apparatus for decoding codes applied to objects for use with an image sensor that includes a two dimensional field of view (FOV), the method comprising the steps of providing a processor programmed to perform the steps of obtaining an image of the FOV and applying different decode algorithms to code candidates in the obtained image to attempt to decode the code candidates wherein the decode algorithm applied to each candidate is a function of the location of the code candidate in the FOV.

30 Claims, 15 Drawing Sheets

METHOD AND APPARATUS FOR PERFORMING DIFFERENT DECODING ALGORITHMS IN DIFFERENT LOCATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to code readers and more specifically to code readers that attempt to optimize decode processes to expedite analysis of code candidates in obtained images.

Automated identification of products using optical codes has been broadly implemented throughout industrial operations and in many other applications for many years. Optical codes are patterns composed of elements with different light reflectance or emission, assembled in accordance with pre-defined rules. The elements in the optical codes may be bars or spaces in a linear barcode, or the on/off pattern in a two-dimensional matrix code. The bar code or symbols can be printed on labels placed on product packaging, or directly on the product itself by direct part marking. The information encoded in a bar code or symbol can be decoded using optical readers in fixed-mount installations or in portable hand held devices. In the case of a hand held reader device, a device user directs the device toward a code often with the aid of a light target pattern generated by the device which appears on an object surface to be imaged and the device either automatically obtains images including the code or the user activates the device to obtain images.

At least some reader devices include a camera capable of generating two dimensional images of a field of view. For example, many systems currently employ a two dimensional CCD image sensor which obtains images and generates image data which is provided to a processor. The processor is programmed to examine image data to identify code candidates (e.g., bar code or symbol candidates) and attempt to decode the code candidates. At least some reader devices are programmed to obtain images of a FOV in rapid succession and to attempt to decode any code candidates in the obtained images as quickly as possible. To decode codes, the processor runs one or more decode algorithms.

When obtaining an image of a code, the quality of the image depends on several factors including the angle of a sensor with respect to a surface on which the code is applied, the material and texture of the surface on which the code is applied, code marking quality or damage after marking, ambient and device lighting characteristics, distance from the surface on which the code is applied, optical blur, camera resolution, etc. Image quality affects the ability of a processor running a specific algorithm to decode a code. For example, in many cases a simple decoding algorithm will not be able to successfully decode codes in an image unless the circumstances surrounding image acquisition are substantially ideal.

To compensate for imperfect image acquisition, relatively more complex decode algorithms have been developed. For instance, several decode algorithms have been developed which can at least partially compensate for imperfect lighting, a curved surface that a code is applied to, imperfect sensor angle with respect to the surface that a code is applied to, etc.

While complex decode algorithms work well to compensate for imperfect images, one draw back is that complex algorithms often require a greater amount of processing power and a commensurate amount of time to perform. Hereinafter, unless indicated otherwise, algorithms that are relatively complex or more generally algorithms that require a relatively long period to perform will be referred to as "expensive" or "more expensive" algorithms while algorithms that are relatively simple or more generally that require a relatively short period to complete will be referred to as "inexpensive" or "less expensive" algorithms.

While more expensive algorithms are not an issue in some applications, in applications where images are obtained in rapid succession, expensive algorithms requiring relatively long periods to complete can result in computational requirements that far exceed capabilities of reader processors. More specifically, in some cases, image sensors are capable of obtaining and providing images so quickly that a reader device processor cannot perform an expensive algorithm on all code candidates in an image prior to receiving a next image.

Where a processor cannot keep up with the computational demands required to perform an expensive algorithm for all code candidates in a rapid succession of images, one solution may be to forego analysis of candidates in next images until a reader device has attempted to decode all code candidates in a current image. Thus, for instance, where second through fourth images are obtained during the period required to attempt to decode all code candidates in a first image, the second through fourth images would be discarded when a fifth image is obtained and code candidates in the fifth image would be examined. While this solution ensures that the expensive algorithm is applied to all code candidates in a current or first image, this solution simply ignores code candidates in the second through fourth image while candidates in the first image are processed despite the fact that candidates in the subsequent images may be better suited to be decoded. In this case, the overall time required to successfully image and decode a code will be prolonged where the device is unable to successfully decode any candidate in the first image which can result in a bothersome delay for a device user.

BRIEF SUMMARY OF THE INVENTION

Consistent with at least one aspect of some embodiments of the invention, it has been recognized that decode algorithms that have different relative expenses (i.e., that require different amounts of time to complete) can be used to analyze obtained images in order to expedite the overall decoding process to the point where a processor may attempt to identify all of at least a subset of code candidates in an image and to decode all of the candidates in the subset using at least some algorithm. More specifically, which algorithms to apply to portions of an image to identify candidates and which algorithms to apply to specific code candidates in an image can be advantageously determined by location within the image.

For instance, in the case of a hand held reader device where a device user manually moves the reader device during use to align the reader's field of view (FOV) with a code to be read, most users continually move a reader device to better align the code with the FOV and to better position the reader with respect to the surface that the code is applied to until the device indicates that the code has been successfully decoded (e.g., a light is illuminated, a sound is generated, data is returned on a communication channel, etc.). Thus, at the beginning of a manual alignment process and when first images including a code are obtained, the code may be located near the outside edge of a FOV and the camera may be angled with respect to the surface on which the code has been applied. Through manual adjustments and during subsequent imaging, the code will be more aligned with the central portion of the FOV and the camera to surface angle will likely be more optimal. In this case, in at least some embodiments, it makes sense to divide the FOV into a central region of interest (ROI) and a peripheral ROI and to attempt to identify code candidates in and decode code candidates in the central ROI using a more expensive algorithm while attempting to identify code candidates in and decode candidates in the peripheral ROI using a less expensive decode algorithm. Thus, in a first image obtained when a FOV is imperfectly aligned with a code, the code may be located in the peripheral ROI and in that case only less expensive algorithms would be applied to identify the code candidate and decode the code. In a subsequent image that includes the code in the central ROI, more expensive algorithms would be applied to identify the code candidate and decode the candidate code.

Here, in many cases, the less expensive algorithm will successfully decode a code candidate in a first or early image, the device will indicate a successful decode and the process will be completed. In other cases, when the first or early images are examined, neither of the algorithms will be able to successfully decode a code. However, here, in subsequent images, the code candidate associated with the code will reflect a more optimal FOV-to-code alignment and therefore the expensive algorithm will be able to be completed relatively faster and the overall decoding process should be shortened on average.

In other cases the FOV may be divided into three or more ROIs and different decode algorithms may be applied to the candidates in each of the three or more ROIs.

While the ROIs may be pre-specified based on an assumed manner in which a reader device will be employed, in other embodiments the ROIs may be altered essentially in real time to reflect the way in which a device is being employed. For instance, in some cases an "expensive ROI", meaning an ROI in which a processor attempts to locate and decode candidates using a more expensive decode algorithm, may be assigned to a region of a FOV in which a previous code was last successfully decoded. Thus, where the most recently decoded code was located near a left side of a FOV, the expensive ROI may be moved to that location where the balance of the FOV would include a less expensive ROI.

In some embodiments ROIs may be altered essentially in real time to change their relative size based on how fast a device is completing all required candidate decode attempts for an image. For instance, a central expensive ROI may be increased in size if a processor completes all decode attempts for one or a series of images prior to or with at least a threshold period prior to the processor receiving a next image from camera similarly, the expensive ROI may be decreased in size if a processor is unable to attempt to decode all image candidates in a required period. By increasing the size of the central expensive ROI, more code candidates should appear in the central ROI for decode attempts in subsequent images thereby increasing the time required to complete all of the decode attempts for an image.

In some embodiments the locations of code candidates may be used in other ways to determine which algorithms to apply to which codes. For instance, it may be that for a specific expensive algorithm it is known that a processor will always be able to attempt to decode three candidates prior to the processor receiving a next image. Here, the processor may be programmed to select the three most centrally located code candidates for decode attempts using the expensive algorithm and may attempt to decode all other candidates using a less expensive algorithm.

In still other embodiments a reader device processor may be programmed to start at a point of interest within an image, order code candidates in an order where closest candidates to the point of interest are first and candidates further from the point are listed subsequently and to then attempt to decode code candidates in that order until some next image event occurs. Here, the next image event may be reception of a next image from a camera. In other cases the next image event may be triggered by expiration of a timer which times out a period which should expire prior to reception of a next image. Other next image events are contemplated.

Consistent with another aspect of at least some embodiments of the present invention, a reader device processor may be programmed to apply a first relatively inexpensive decode algorithm to code candidates in a series of images and if the device processor fails to successfully decode a code in any of the images, may store those images in a memory. Thereafter, the processor may be programmed to, after a set of images have been stored, re-access one or a sub-set or all of the images and apply a more expensive decode algorithm to all or a subset of the code candidates in the image or images to attempt to decode the candidates. In at least some cases when the image or images are re-accessed, the more expensive algorithm may be applied in a manner consistent with any of the above teachings such as, for instance, by applying the expensive algorithm to an ROI of the image or images that is smaller than the FOV, by applying the expensive algorithm to only a subset of the candidates (e.g., 3) in the image or in each image that are closest to a point of interest, etc. In some cases, when the processor re-accesses more than one image, the processor may start processing the most recently stored image first and work back toward the earlier stored images, as alignment or positioning of the FOV and code in at least some applications (e.g., hand held applications) should be better in the subsequent images. Other orders for processing the stored images are contemplated.

In still other embodiments when a processor is unsuccessful in decoding code candidates in an image, prior to storing the image for subsequent processing, the processor may assign a decode success factor to the image which can be used by the processor to identify a subset of the stored images that the processor should analyze using the expensive algorithm.

In still other embodiments the processor may be programmed to attempt to decode all code candidates using an inexpensive algorithm and, when all attempts fail, to attempt to decode only a subset of the candidates based on location as indicated in any of the examples above. In the alternative, the processor may be programmed to assign a decode success factor to at least a subset (e.g., 3-5) of the code candidates that, based on the less expensive decode attempts, have the highest likelihood of being successfully decoded using the expensive algorithm and may then apply the expensive algorithm to the candidate subset.

Moreover, in at least some cases, when the processor re-accesses a code candidate that the processor attempted to decode previously using a less expensive algorithm, the processor may use information generated when the less expensive algorithm was applied to expedite the process for completing the more expensive algorithm. For instance, where the processor was able to analyze three fourths of a code using the less expensive algorithm, that information may be used to expedite the subsequent algorithm.

Some embodiments include a method for decoding codes applied to objects for use with an image sensor that includes a two dimensional field of view (FOV), the method comprising the steps of providing a processor programmed to perform the steps of, obtaining an image of the FOV, identifying at least first and second regions of interest (ROIs) in the image wherein the first ROI is different than the second ROI, attempting to decode code candidates in the first ROI using a first decode algorithm and attempting to decode code candidates in the second ROI using a second decode algorithm that is different than the first decode algorithm.

In some cases the first decode algorithm is computationally more complex than the second decode algorithm. In some cases the first decode algorithm requires a greater amount of time to complete than the second decode algorithm. In some cases the first ROI includes a central portion of the FOV. In some cases the second ROI includes portions of the FOV surrounding the first ROI. In some cases the first decode algorithm includes the second decode algorithm and an additional decode algorithm. In some cases the first ROI includes an ROI corresponding to the location of a successfully decoded code in a prior image.

In some cases the method further includes the steps of identifying at least a third ROI in the image which is different than the first and second ROIs and attempting to decode code candidates in the third ROI using a third decode algorithm that is different than the first and second decode algorithms. In some embodiments the method further includes the steps of receiving an indication from an individual indicating the first ROI or optimal location. In some cases the first ROI includes a position within the FOV and a distance relative to the position. In some cases the position consists of a location along a single axis within the image. In some cases the image sensor forms part of a portable code reading device. In some cases the image sensor forms part of a hand held code reading device.

In some embodiments the sensor obtains images in a repetitive fashion and wherein the size of the first ROI is determined at least in part as a function of the time required to attempt to decode code candidates in the first ROI in a prior obtained image. In some cases the sensor obtains images in a repetitive fashion and wherein the second decode algorithm is selected at least in part as a function of the time required to attempt to decode code candidates in a prior obtained image. In some cases the first and second ROIs are prespecified prior to obtaining the image.

Some embodiments include a method for decoding codes applied to objects for use with an image sensor that includes a two dimensional field of view (FOV), the method comprising the steps of providing a processor programmed to perform the steps of, obtaining an image of the FOV and applying different decode algorithms to code candidates to attempt to decode the code candidates wherein the decode algorithm applied to each candidate is a function of the location of the code candidate in the FOV.

In some cases a first decode algorithm is applied to code candidates within a first region of interest (ROI) and a second decode algorithm that is different than the first decode algorithm is applied to code candidates in a second ROI that is different than the first ROI. In some cases the first ROI includes a central portion of the sensor FOV and the second ROI includes portions of the FOV that surround the first ROI. In some cases the sensor forms part of a hand held device. In some cases the function that determines which decode algorithms are applied to which code candidates changes to optimize the decode process.

In some cases the decode algorithms include at least a first relatively complex decode algorithm and a second relative simple decode algorithm and wherein the function changes to alter the ratio of code candidates to which the first and second decode algorithms are applied. In some cases the ratio is altered as a function of the time required to attempt to decode code candidates in the FOV using the first and second decode algorithms.

Still other embodiments include a method for decoding codes applied to objects for use with an image sensor that includes a two dimensional field of view (FOV), the method comprising the steps of providing a processor programmed to perform the steps of, (i) obtaining an image of the FOV, (ii) attempting to decode a the code candidate in the image using a first decode algorithm, (iii) where the attempt to decode the code candidate fails, maintaining the image in memory, (iv) repeating steps (i) through (iii) until one of a threshold number of attempts to decode the code candidate have failed and the code candidate has been successfully decoded, when the threshold number of attempts to decode the code candidate have failed, accessing the images maintained in memory and attempting to decode the code candidate in at least a subset of the images stored in memory using a second decoding algorithm that is different than the first decoding algorithm.

Other embodiments include an apparatus for reading codes applied to objects, the apparatus comprising image sensor that includes a two dimensional field of view (FOV), a processor linkable to the sensor to obtain image data there from, the processor programmed to perform the steps of, obtaining an image of the FOV, identifying at least first and second regions of interest (ROIs) in the image wherein the first ROI is different than the second ROI, attempting to decode code candidates in the first ROI using a first decode algorithm and attempting to decode code candidates in the second ROI using a second decode algorithm that is different than the first decode algorithm.

In some cases the first decode algorithm is computationally more complex than the second decode algorithm. In some cases the first decode algorithm requires a greater amount of time to complete than the second decode algorithm. In some cases the first ROI includes a central portion of the FOV.

Yet other embodiments include an apparatus for decoding codes applied to objects for use with an image sensor that includes a two dimensional field of view (FOV), the apparatus comprising an image sensor including a two dimensional field of view (FOV), a processor linkable to the image sensor and programmed to perform the steps of obtaining an image of the FOV and applying different decode algorithms to code candidates to attempt to decode the code candidates wherein the decode algorithm applied to each candidate is a function of the location of the code candidate in the FOV.

In some cases a first decode algorithm is applied to code candidates within a first region of interest (ROI) and a second decode algorithm that is different than the first decode algorithm is applied to code candidates in a second ROI that is different than the first ROI.

Other embodiments include an apparatus for decoding codes applied to objects for use with an image sensor that includes a two dimensional field of view (FOV), the apparatus comprising an image sensor including a two dimensional field of view (FOV), a processor linkable to the image sensor and programmed to perform the steps of (i) obtaining image data corresponding to an image of the FOV from the sensor, (ii) attempting to decode a the code candidate in the image using a first decode algorithm, (iii) where the attempt to decode the code candidate fails, maintaining the image data in memory, (iv) repeating steps (i) through (iii) until one of a threshold number of attempts to decode the code candidate have failed and the code candidate has been successfully decoded, when the threshold number of attempts to decode the code candidate have failed, accessing the image data maintained in memory and attempting to decode the code candidate in at least a subset of the image data stored in memory using a second decoding algorithm that is different than the first decoding algorithm.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
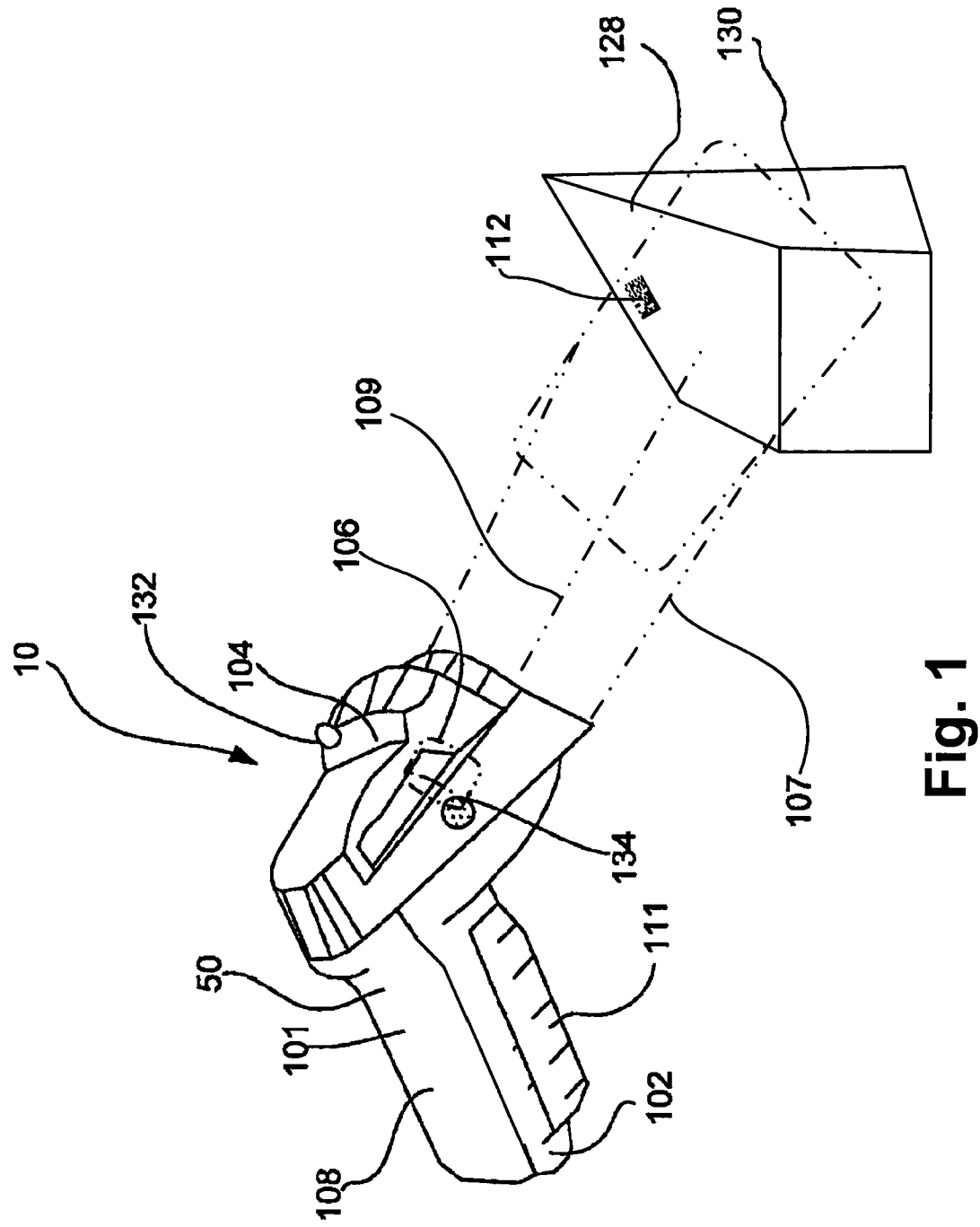
FIG. 1 is a schematic diagram illustrating a hand-held code reader having features that are consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIGS. 1 and 2, the present invention will be described in the context of an exemplary handheld symbol or code reader 10 including a housing 101 having a grip section 102, a body/barrel section 104 and a trigger 111, a CCD or other type camera/sensor 105, optics/lenses 106, a processor 108, a timer 109, one or more indicator LEDs 132, LEDs (not illustrated) for illumination of a reader field of view, a speaker/audio component 134, a battery 53, a memory 52 and a light source/subassembly 54. Each of the processor 108, timer 109, battery 53, optics 106, memory 52 and light source 54 are mounted in or otherwise supported by housing 101. Processor 108 is linked to each of timer 109, battery 53, memory 52, optics 106, camera/sensor 105, source 54, indicator LEDs 132, the illumination LEDs and output 134. Processor 108 runs programs stored in memory 52 to perform inventive processes.

Unless indicated otherwise, the present invention will be described in the context of the illustrated hand held reader device 10 and it will be assumed that the processor 108 is programmed to examine obtained images for code candidates and to attempt to decode the code candidates until any one of the candidates is successfully decoded. Once a candidate is successfully decoded, processor 108 causes LED 132 and/or output 134 to generate a signal to indicate a successful decode to a device user. Nevertheless, it should be appreciated that at least some of the aspects and embodiments herein would be applicable in reader devices mounted for stationary use or in cases where a processor is programmed to search for and decode more than one code in any image or set of images.

Referring again to FIGS. 1 and 2, optics 106 focus a field of view (FOV) 107 on a CCD or other type of sensor device 105 within reader 10 which in turn generates data comprising a high resolution images of items located within FOV 107. Field of view 107 is centered along a FOV axis 109. Thus, when the FOV 107 is directed toward a code 112 applied on a surface 128 of an item 130 and reader 10 is activated to generate images, images including code 112 are obtained. Camera 105 generates a rapid succession of consecutive images. While the time between consecutive images is rapid, the time varies based on several factors known to those of skill in the code reading arts.

Figure 3:
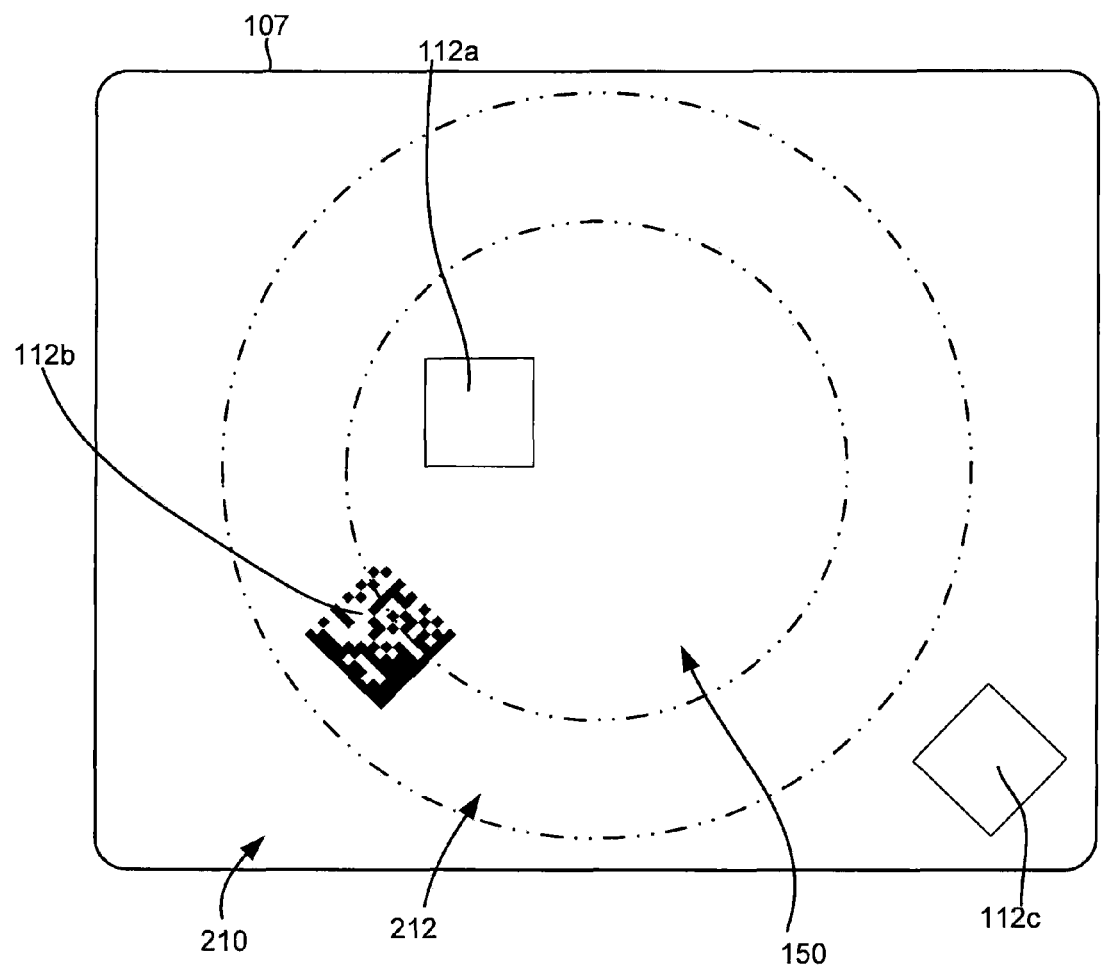
FIG. 3 is an illustration of an exemplary field of view, exemplary regions of interest within the field of view and exemplary code candidates within the field of view.

Referring now to FIG. 3, an exemplary FOV 107 is illustrated. Within the FOV 107, as shown, there are three code candidates 112a, 112b and 112c wherein only code candidate 112b corresponds to an actual matrix code. Thus, candidates 112a and 112c simply represent image artifacts that, upon an initial analysis of the image, have some characteristics that are consistent with the artifacts being actual matrix codes to be decoded.

Referring still to FIG. 3, in at least some embodiments of the present invention, the FOV 107 may be divided into separate regions of interest (ROIs) where different decode algorithms will be employed by processor 108 (see again FIG. 2) to attempt to decode code candidates in the different ROIs. For instance, in FIG. 3, an exemplary ROI 150 includes a circular central portion of the FOV 107. In this case, the balance of the FOV 107 outside the first ROI 150 may be considered a second ROI 212. In this embodiment, it is contemplated that a first decode algorithm is used to attempt to decode any code candidates within the first ROI 150 while a second decode algorithm is used to decode any code candidates that exist in the second ROI 210. Thus, in FIG. 3, the first decode algorithm would be used to attempt to decode candidate 112a while the second decode algorithm would be used to attempt to decode code candidate 112c.

In at least some embodiments, the decode algorithm used to attempt to decode code candidate 112b which is partially within the first ROI 150 and partially within the second ROI 210 may depend upon the percentage of code candidate 112b which resides within ROI 150. For instance, where more than 50% of candidate 112b resided within ROI 150, the first decode algorithm may be used to attempt to decode candidate 112b. In other embodiment, if any part of a candidate such as 112b resides within ROI 150, the first decode algorithm may be used to attempt to decode the candidate 112b.

In the above example, in at least some embodiments, the first decode algorithm used to attempt to decode code candidates within or associated with first ROI 150 will a relatively more robust or complex algorithm that is relatively more computationally intensive than the second decode algorithm and that therefore requires a greater amount of time to complete than the second decode algorithm. Herein, based on required time, the first decode algorithm is said to be more expensive than the inexpensive second decode algorithm. Thus, for example, the first decode algorithm may, on average, require a period three or more times greater than the period required to complete the second decode algorithm.

Figure 4:
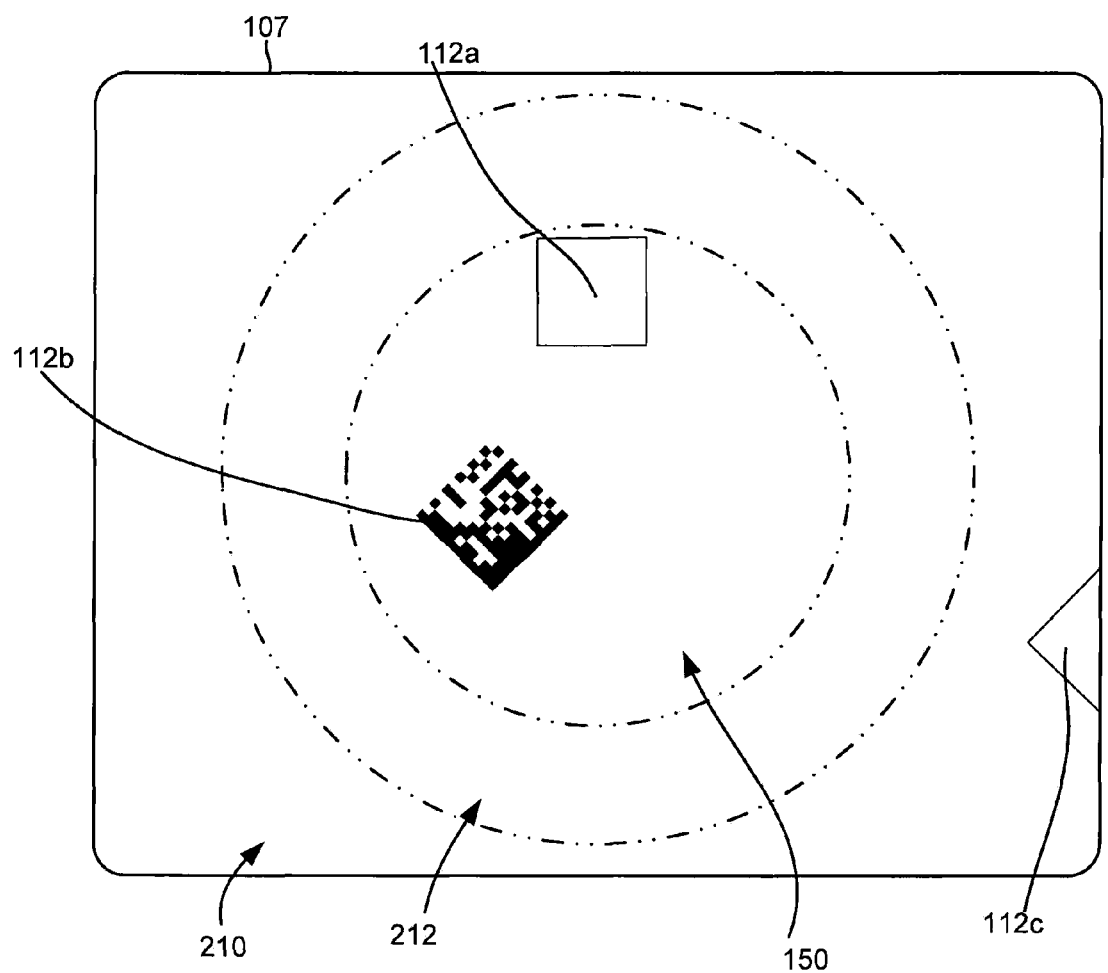
FIG. 4 is similar to FIG. 3, albeit showing the code candidates in different relative positions with respect to the field of view and the regions of interest.

The example described above with respect to FIG. 3 where the first ROI 150 includes a central portion of the field of view 107 is particularly advantageous in the context of a hand-held reader device 10 like the one illustrated in FIG. 1 where a device user, aided by aiming illumination from the device 10, moves the device 10 around in an attempt to align FOV 107 with a code to be imaged and decoded. Thus, it has been recognized that a hand-held device user attempting to align a FOV with a code to be imaged will typically move the device around to increase FOV and code alignment until a code has been imaged and successfully decoded. Thus, while a code to be imaged may initially reside within second ROI 210 when images are first obtained, within a short time, the code to be decoded will typically be located within first ROI 150 of FOV 107. For instance, referring again to FIG. 3, the actual code 112b to be decoded is primarily located within the peripheral ROI 210 as shown. FIG. 4 shows an image similar to FIG. 3, albeit a short time thereafter when the hand-held device 10 (see again FIG. 1) has been moved by a user to better align the FOV 107 with candidate 112b so that candidate 112b resides within ROI 150.

Figure 2:
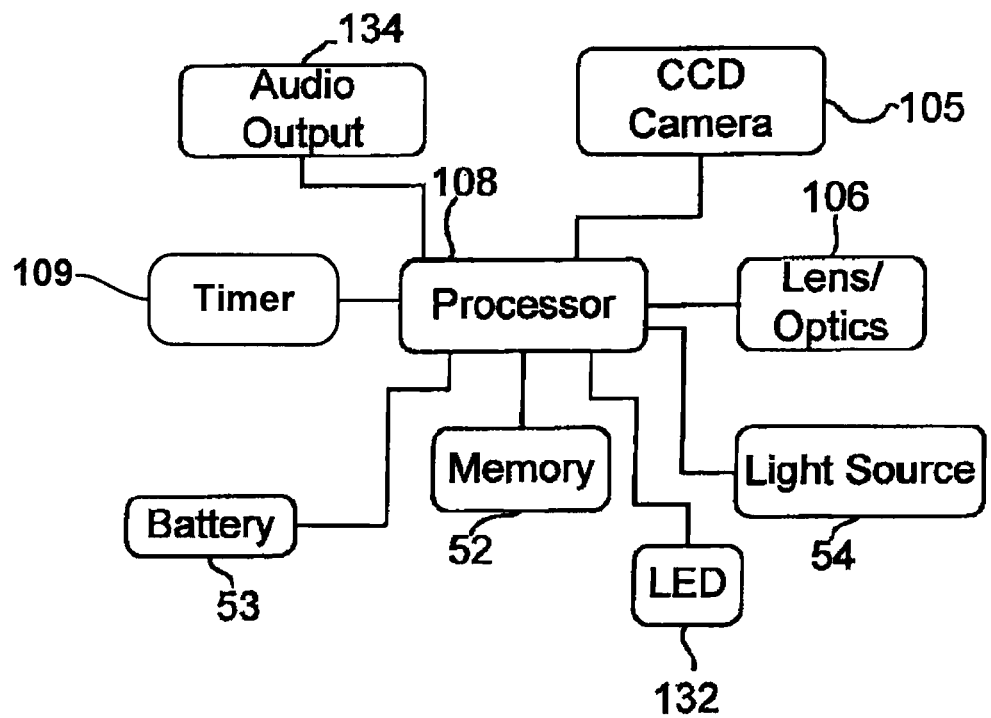
FIG. 2 is a schematic diagram illustrating internal components included in the hand-held device shown in FIG. 1.
Figure 5:
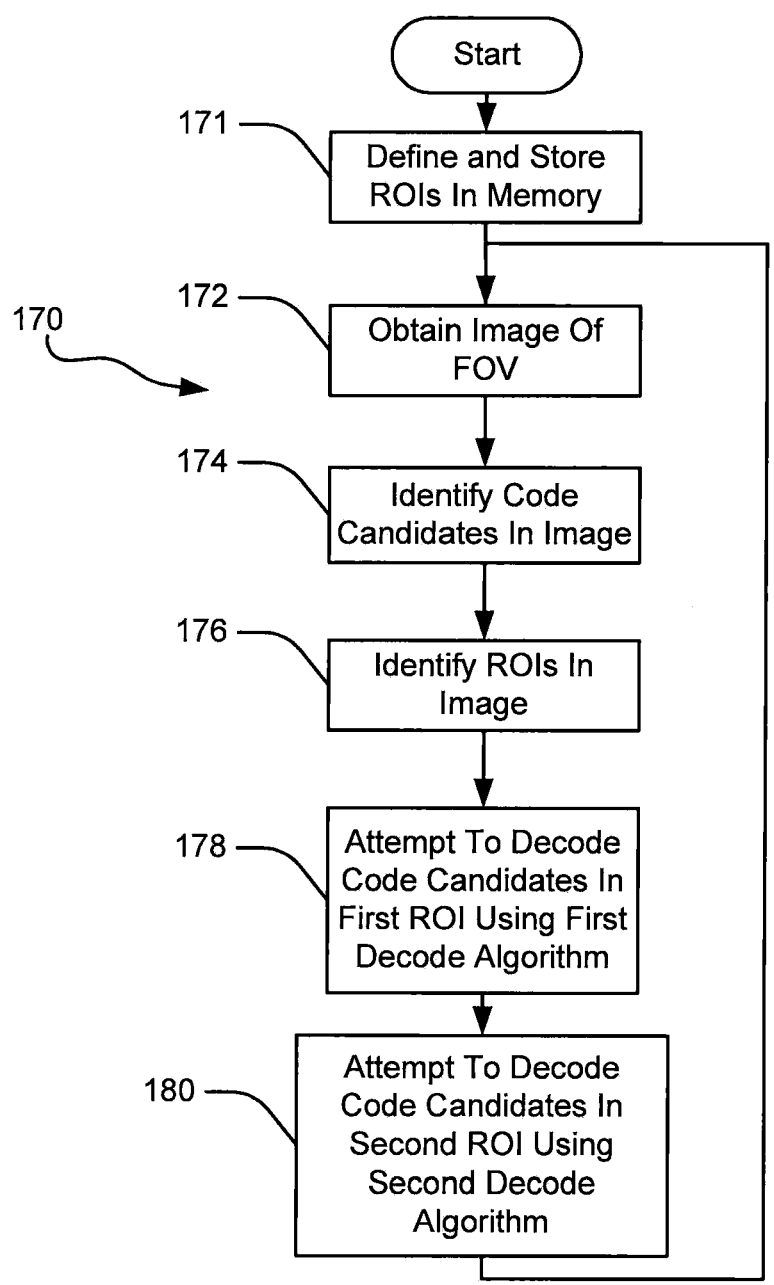
FIG. 5 is a flow chart illustrating a method whereby the processor shown in FIG. 2 performs different decode algorithms for code candidates in different regions of interest in a field of view.

Referring now to FIG. 5, an exemplary process 170 that may be performed by the processor 108 in FIG. 2 and that is consistent with the example described above with respect to FIGS. 3 and 4 is illustrated. At block 171, regions of interest are defined and stored in memory 52 shown in FIG. 2. Referring again to FIG. 3, the exemplary ROIs that are defined and stored include ROIs 150 and 210 in the illustrated example. Next, at block 172, camera sensor 105 in FIG. 2 obtains an image of the field of view 107 and provides that image to processor 108. Upon receiving the image, processor 108 identifies code candidates in the image at block 174. Again, in FIG. 3, exemplary candidates that would be identified include candidate 112a, 112b, and 112c. At block 176, processor 108 identifies ROIs 150 and 210 in the image.

Continuing, at block 178 in FIG. 5, processor 108 attempts to decode code candidates in the first ROI 150 using the first more expensive or complicated decode algorithm. Referring again to FIG. 3, at block 178 processor 108 only attempts to decode code candidate 112a using the expensive algorithm as the other candidates 112b and 112c reside outside ROI 150. At block 180, processor 108 attempts to decode code candidates that reside in the second ROI 210 (e.g., within the portion of field of view outside first ROI 150) using a second or less expensive decode algorithm. Thus, at block 180, processor 108 attempts to decode code candidate 112b and candidate 112c using the second, less expensive decode algorithm. After block 180, control passes back up to block 172 where camera 105 obtains a next image of the field of view 107 and provides that image to processor 108.

The process shown in FIG. 5 continues repeatedly until any one of the code candidates is successfully decoded. Thus, for instance, if candidate 112b is successfully decoded using the second less expensive decode algorithm, processor 108 indicates that the code has been successfully decoded by illuminating LED 132 and/or generating a sound via audio output 134 (see again FIG. 2) and the image obtaining and candidate decoding process halts. In the example illustrated in FIGS. 3 and 4, eventually, either the second decode algorithm will be successful in decoding candidate 112b or candidate 112b will appear within the first ROI 150 and the first more expensive decode algorithm will be performed by processor 108 to decode the candidate. While FIG. 5 shows the first decode algorithm being performed first, in other embodiments the second decode algorithm may be performed for candidates in the second ROI first, followed by the first algorithm for candidates in the first ROI. In still other embodiments the first and second decode algorithms may be commenced in parallel or performed at least in part in parallel as opposed to sequentially.

While FIG. 3 shows a circular central first ROI 150, it should be appreciated that the FOV 107 may be divided into many other ROI patterns. For example, in at least some embodiments as shown in FIG. 3, the second ROI 210 may be divided into second and third ROIs 212 and 210, respectively, where the second ROI 212 includes a portion of the field of view 107 that surrounds the first ROI 150 and the third ROI 210 includes the portion of the field of view 107 that surrounds the second ROI 212. Here, it is contemplated that processor 108 may be programmed to perform first, second and third different decode algorithms on code candidates that appear within the first, second and third ROIs 15, 212 and 210, respectively, in a fashion similar to that described above.

Figure 6:
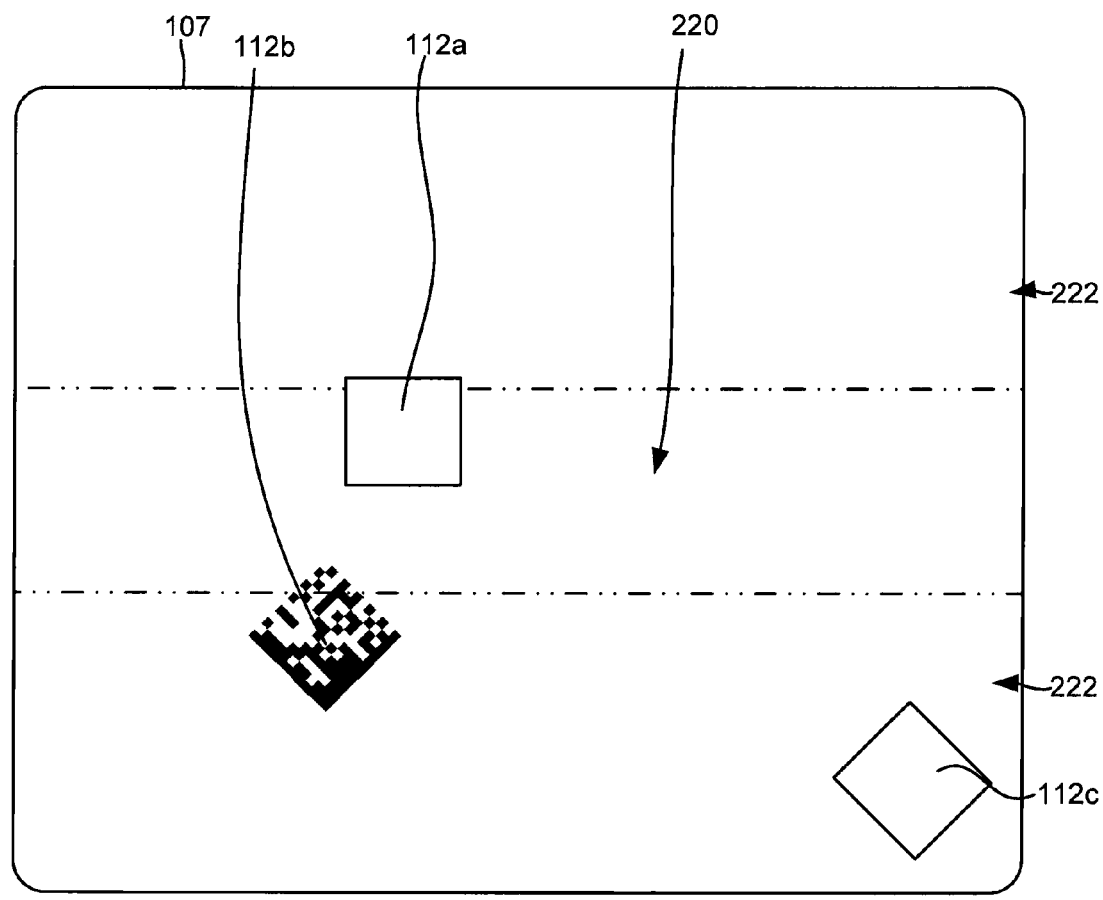
FIG. 6 is a schematic diagram similar to FIG. 3, albeit showing a different region of interest pattern.

As another example, referring to FIG. 6, FOV 107 is shown divided into first and second ROIs 220 and 222, respectively, where the first ROI 220 includes a central horizontal band through the field of view 107 and the second ROI 222 includes the balance of the field of view 107 above and below band 220. The embodiment shown in FIG. 6 may be particularly useful in the case of a reader device that is mounted for stationary operation above a transfer line where it is known that objects marked with codes will typically be positioned on the transfer line such that the codes will usually appear within the band ROI 220.

Figure 7:
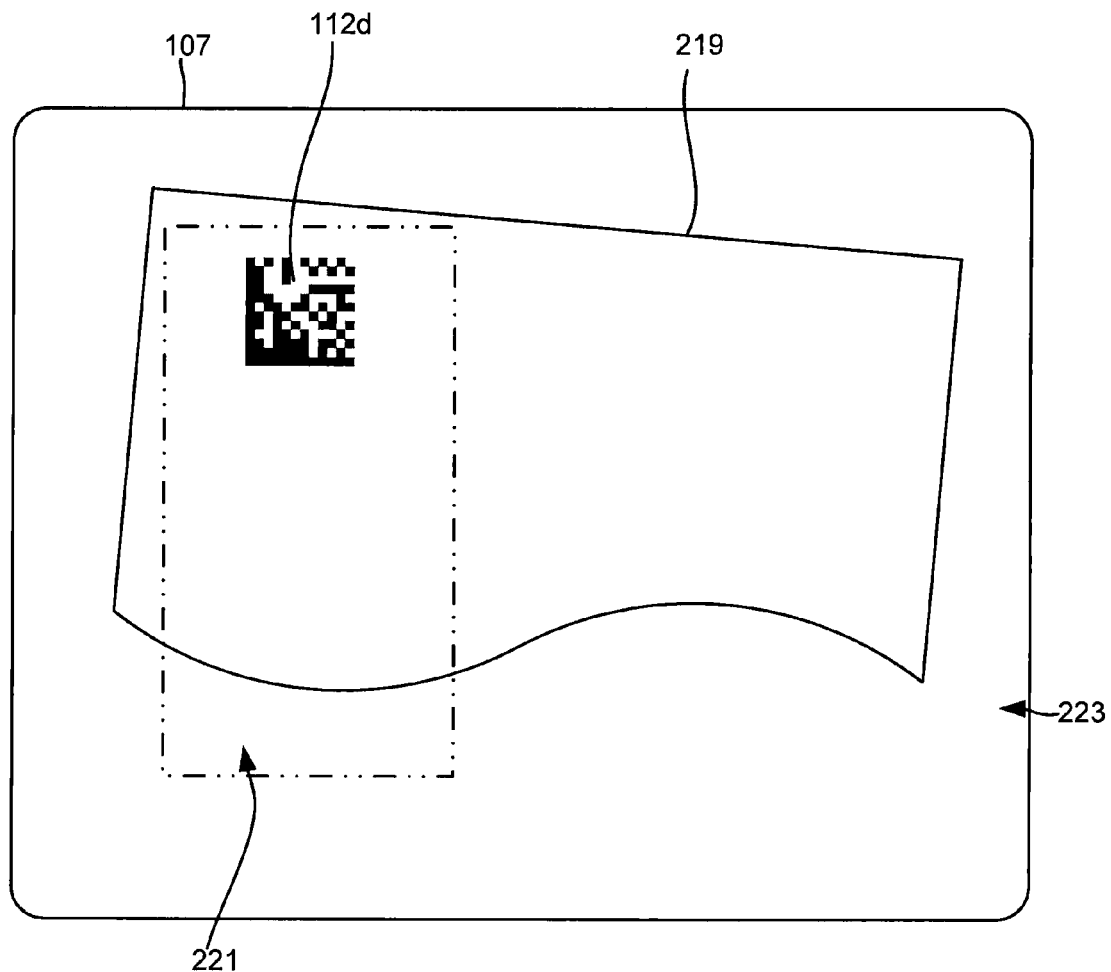
FIG. 7 is similar to FIG. 3, albeit showing another region of interest pattern.

Referring to FIG. 7, yet another ROI pattern is schematically shown where a first ROI 221 includes a rectangular portion of the FOV 107 and the balance of the FOV 107 forms the second ROI 223. The ROI definition shown in FIG. 7 maybe particularly useful where components (e.g., see 219 in FIG. 7) are moved along by a transfer line through the FOV 107 and the camera 105 is triggered to obtain images for decoding purposes by an object position sensor and where it is known that a code appearing on an exemplary object will typically be within the first ROI 221 when the trigger occurs.

Figure 8:
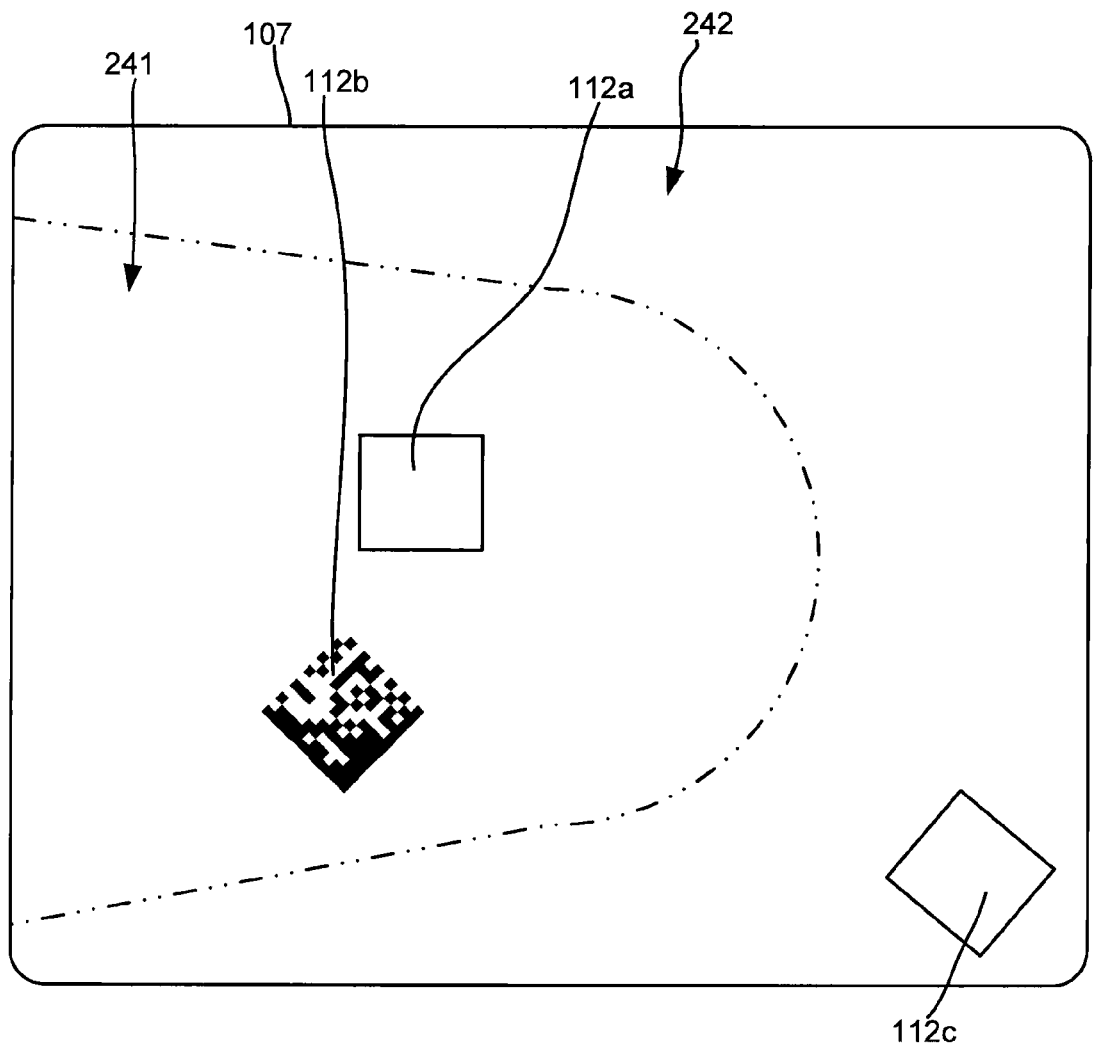
FIG. 8 is similar to FIG. 3, albeit showing another region of interest pattern.

FIG. 8 shows yet another ROI pattern or definition schematically where a first ROI 241 includes a space about a central portion of the FOV 107 that flares out to one side and the second ROI 242 includes the balance of the FOV 107. This ROI pattern may also be useful in the context of a stationary reader device where a transfer line moves objects through the field of view 107 from right to left as shown in FIG. 8 such that the less expensive decode algorithm is attempted first followed by the more expensive decode algorithm for each candidate and where the ROIs reflect the fact that codes may typically appear within a central horizontal band of the FOV 107 in a specific application.

Figure 9:
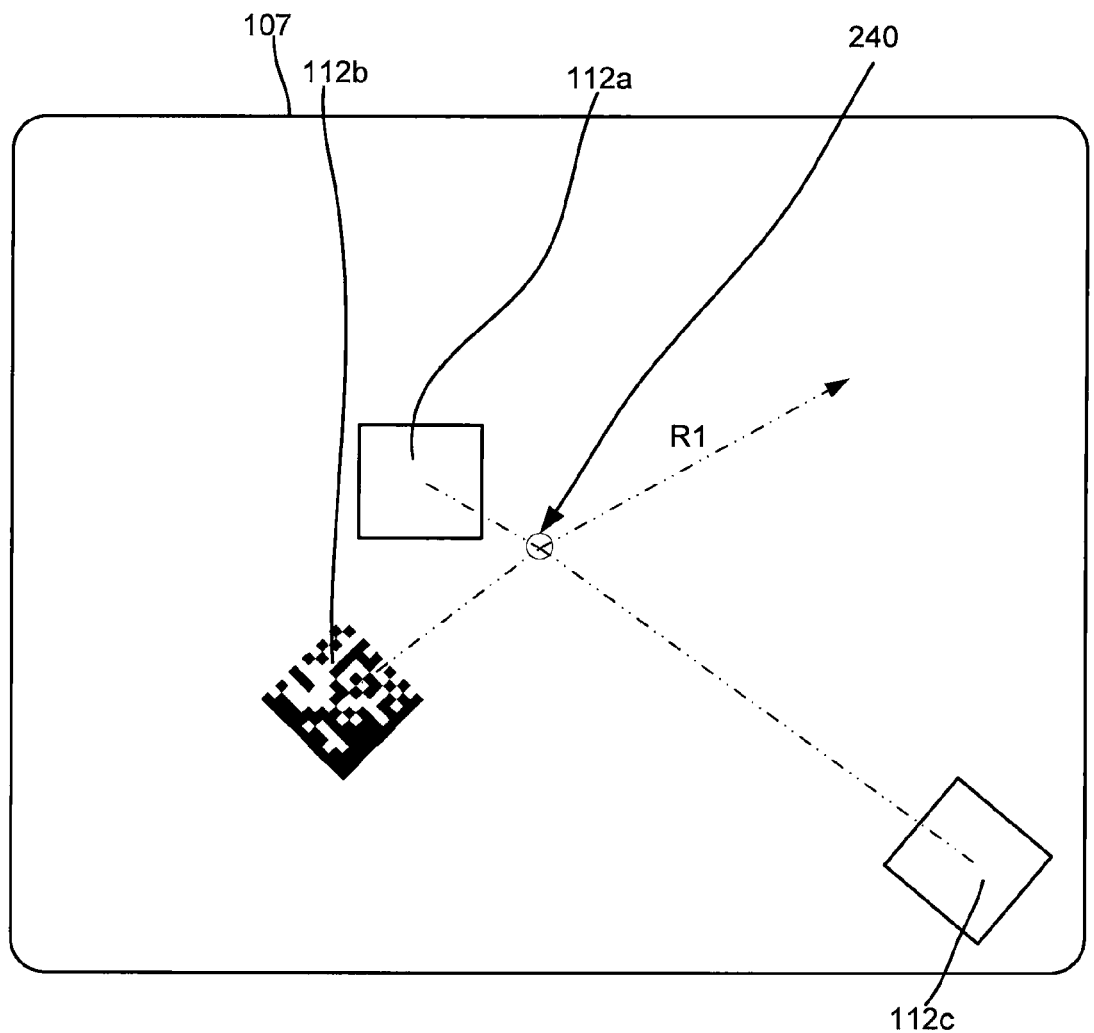
FIG. 9 is similar to FIG. 3, albeit showing a point of interest within a field of view as well as code candidates.

In some embodiments it is contemplated that ROIs may instead be defined by the distances from one or more points within the FOV 107. To this end, referring now to FIG. 9, an exemplary central point or central point of interest within the FOV 107 is identified by numeral 240. Here, each of the code candidates 112a, 112b and 112c is located within an obtained image of the field of view 107 at a different distance from point 240. The first ROI may be defined by point 240 and a radial value R1 from the point 240 such that any candidate within the distance R1 from point 240 would be within the first ROI and therefore would be decoded using the first, more expensive decode algorithm while candidates outside that space would be in the second ROI and decoded using the second decode algorithm.

In still other embodiments, it is contemplated that, based on a known or estimated time for obtaining a next image, the processor 108 may be programmed to attempt to decode only a specific number of code candidates using the first and relatively expensive decode algorithm where the candidates would be selected based on their locations and, more specifically, based on the distances between a point (e.g., see 240 in FIG. 9) within the field of view and each of the candidates. For example, processor 108 may be programmed to attempt to decode only the three code candidates which are closest to point 240 in FIG. 9 using the first decode algorithm and to attempt to decode any other code candidates in the field of view 107 using the second decode algorithm.

Figure 10:
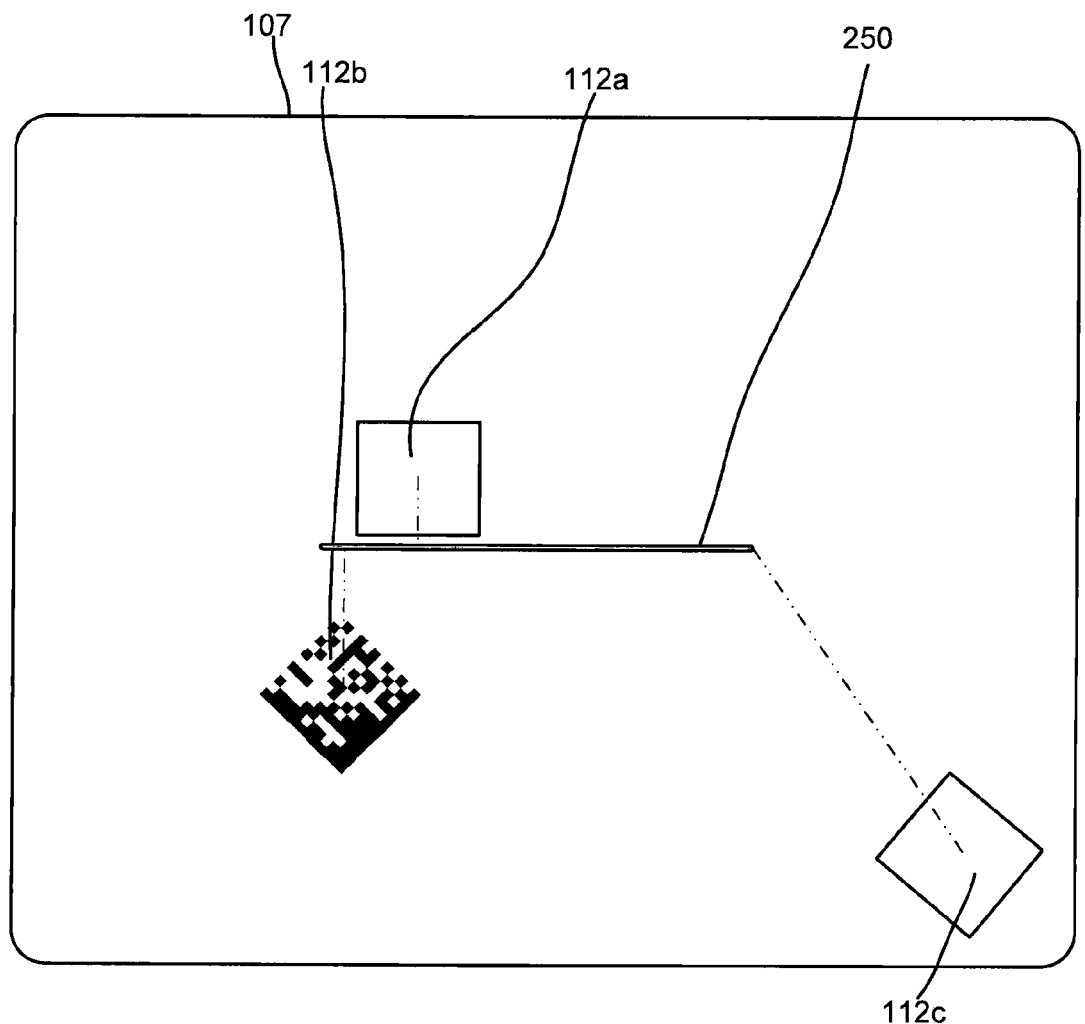
FIG. 10 is similar to FIG. 9, albeit showing a line of interest within a field of view.

Referring to FIG. 10, instead of identifying code candidate locations based on distance from a point, the locations may be based on distance from a line 250. Here, processor 108 would decode candidates closest to the line 250 first and work outward to other candidates. Other geometric shapes in addition to a point or line for referencing candidate locations are contemplated.

Referring once again to FIG. 3, while the example described above with respect to FIG. 3 and the other examples described above require that the second decode algorithm be performed only on code candidates that reside within a second ROI which is completely separate from the first ROI, in at least some embodiments, the second ROI may include the entire FOV 107 such that the second and the less expensive decode algorithm is performed for every code candidate within the field of view 107. Thus, for instance, in FIG. 3, in at least some embodiments the second decode algorithm would initially be performed on each of the code candidates 112a, 1112b and 112c. If the second decode algorithm successfully decodes a code, processor 108 may indicate successful decoding and stop the process. However, where the second decode algorithm is not successful in decoding a code, the first decode algorithm would then be applied to any code candidates within the first ROI. In still other embodiments the first decode algorithm may in fact include the second decode algorithm so that the second algorithm is effectively performed for all candidates in an image.

In still other embodiments ROIs may be selected essentially in real time to reflect how a reader device user is using the device. For instance, an expensive ROI may be selected as a region of a FOV in which a code was most recently successfully decoded during a prior decoding process or a current expensive ROI may be altered as a function of the location of in which a code was most recently successfully decoded during a prior decoding process. For instance, referring again to FIG. 3, if candidates are routinely decoded near the left edge of FOV 107 using an inexpensive decode algorithm, that may be evidence that a user of a hand held device routinely moves the device from the left while aligning with a code. Here, it may make sense to change the expensive ROI from the central ROI 150 shown in FIG. 3 to the ROI 241 shown in FIG. 8.

In addition, in at least some embodiments it is contemplated that the ROIs may be dynamically adjusted in order to optimize the decoding process as a function of reader operation. For example, in at least some cases it maybe that the circumstances surrounding image acquisition result in very good images which can be decoded relatively quickly using even the complex or expensive first decode algorithm such that the first ROI (e.g., see 150 in FIG. 3) size could be increased while still attempting to decode all candidates within the first ROI using the first decode algorithm prior to the camera 105 generating a next image.

Figure 11:
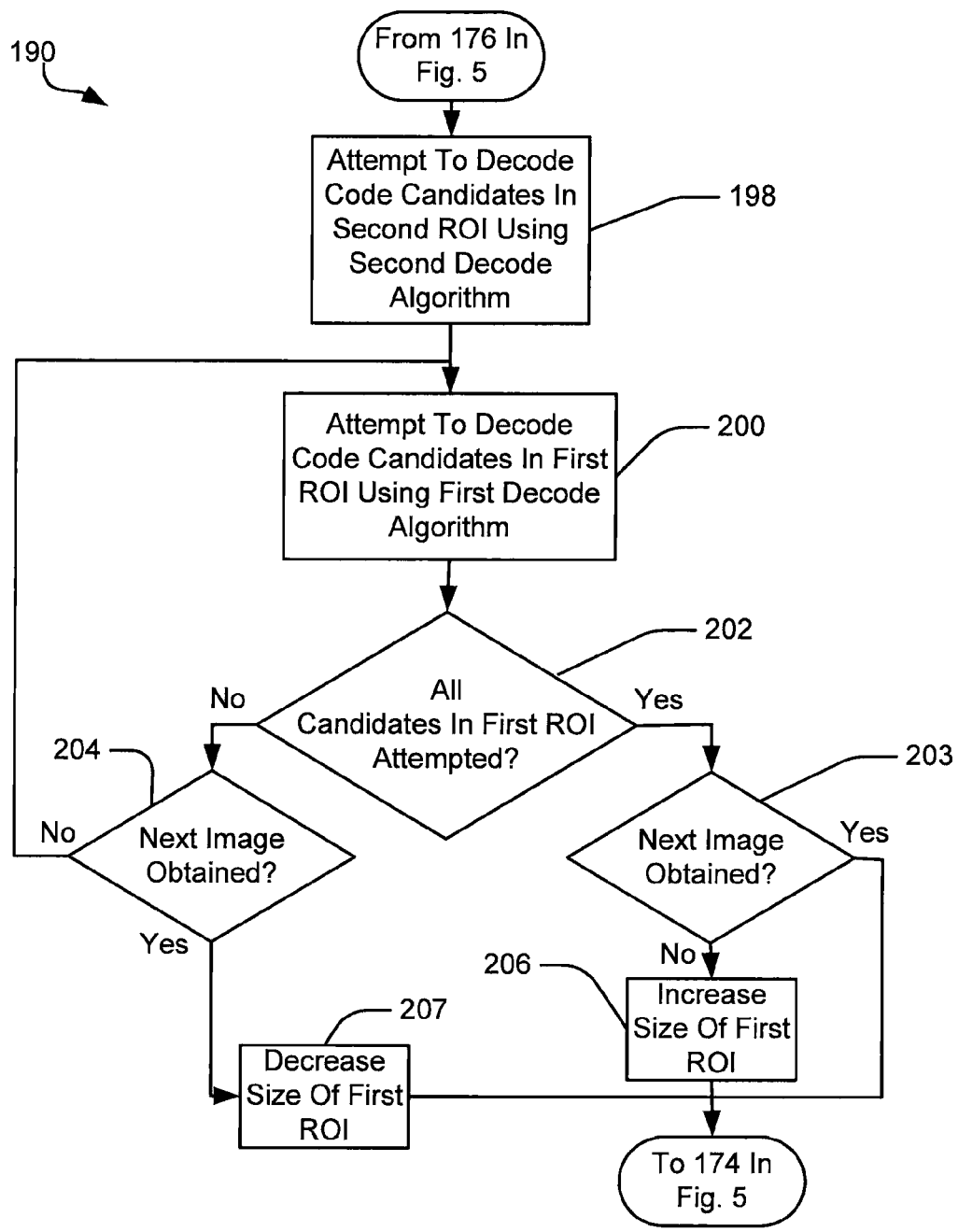
FIG. 11 is a subprocess that may be substituted for a portion of the process shown in FIG. 5 whereby the region of interest pattern within a field of view is changed to optimize a decode process.

Referring now to FIG. 11, a subprocess 190 that may be substituted for a portion of the process shown in FIG. 5 is illustrated where a first ROI size is adjusted to optimize the decoding process. To this end, after ROIs are identified at block 176 in FIG. 5, control may pass to block 198 in FIG. 11 where processor 108 attempts to decode code candidates in a second ROI using a second decode algorithm. At block 200, processor 108 attempts to decode code candidates in a first ROI using an first relatively expensive decode algorithm. At block 202, processor 108 determines whether or not the processor has attempted to decode all of the candidates in the first ROI using the first decode algorithm. Where additional code candidates exist, control passes to block 204 where processor 108 determines whether or not camera 105 has provided a next image. Where camera 105 has not provided a next image, control passes back up to block 200 where the process described above is repeated.

Referring still to FIG. 11, at block 204, when a next image has been obtained from camera 105, control passes to block 207 where the size of the first ROI is decreased after which control passes back up to block 174 in FIG. 5. Referring again to block 202, when processor 108 determines that the processor has attempted to decode all of the code candidates in the first ROI using the first decode algorithm, control passes to block 203. At decision block 203, processor determines whether or not a next image has been received from camera 105. Where a next image has not been received from camera 105, control passes to block 206 where processor 108 increase the size of the first ROI after which control passes to block 174 in FIG. 5. At block 203, if the processor 108 determines that a next image has been obtained, control simply passes to block 174 in FIG. 5 without adjusting the size of the first ROI.

Although not shown, in some cases, if processor 108 determines that a next image has not been obtained at block 203, processor 108 may determine a minimum time prior to obtaining a next image and only increase the size of the first ROI if the minimum time is greater than some threshold value. In addition, in at least some cases processor 108 may be programmed to require a consecutive series (e.g., 5, 10, etc.) of negative results at block 203 for a series of images prior to increasing the size of the first ROI at block 206.

In at least some embodiments it is contemplated that processor 108 may only perform a first relatively slow and expensive decode algorithm but that the processor will only perform the decode algorithm on a subset of the code candidates within a field of view where the subset is based on location within the field of view. For example, referring again to FIG. 9, processor 108 may be programmed to decode code candidates in an order that depends on the distances of the code candidates from center point 240 of FOV 107 where the processor stops decoding candidates after a next image has been obtained and restarts the process using the next image. Thus, for instance, in FIG. 9, processor 108 would start with attempting to decode candidate 112*a* which is closest to point 240. Next, if time permits, processor 108 would attempt to decode the second closest code candidate, candidate 112*b*, using the first decode algorithm which, if time permits, would be followed by an attempt to decode candidate 112*c* using the first decode algorithm, and so on.

Figure 12:
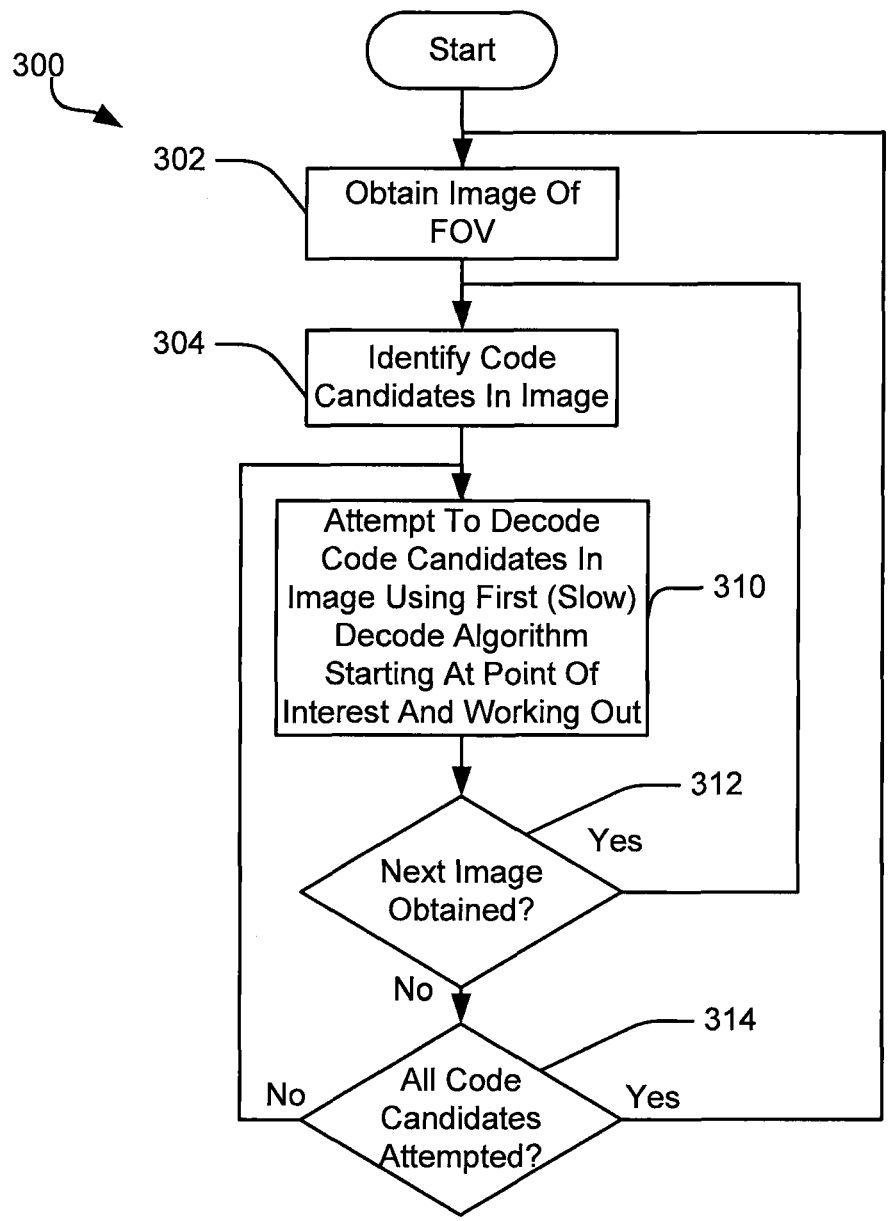
FIG. 12 is a process that may be performed by the processor shown in FIG. 2 for optimizing a decode process.

Referring to FIG. 12, a process 300 that maybe performed by processor 108 to decode code candidates in an order that depends on their relative location with respect to a center point is shown. At block 302, an image of the field of view is obtained. At block 204, code candidates within the images are identified. At block 310, processor 108 attempts to decode code candidates in the obtained image using the first relatively expensive decode algorithm starting at a point of interest (e.g., the center point 240 shown in FIG. 9) and working outward from there. At block 312, processor 108 determines whether or not a next image has been obtained. If camera 105 has provided a next image at 312, control passes back up to block 304 where the process continues. At block 312, if a next image has not been obtained, control passes to block 314 where processor 108 determines whether or not the processor has attempted to decode each of the code candidates within the field of view. When the processor 108 has not attempted to decode at least one of the code candidates within the field of view, control passes back up to block 310 where the process continues as illustrated. If the processor has attempted to decode all the code candidates using the first decode algorithm at block 314, control passes back up to block 302 where the processor 108 waits to receive the next image from the camera 105.

In at least some embodiments it is contemplated that camera 105 will provide images substantially at regular intervals (e.g., within a known period range) so that the period between images is generally known. In this case, processor 108 can be programmed to use timer 109 to timeout the period between consecutive images and to attempt to decode as many code candidates as possible within the timeout periods where the subset of candidates being decoded again would be based on location within the field of view. For instance, referring again to FIG. 9, for example, processor 108 may be programmed to attempt to decode code candidates in an order wherein the processor attempts the candidate closest to center point 240 first followed by the candidate second closest to point 240, and so on, until the imaging timeout period has transpired. Once the timeout period has transpired, processor 108 would essentially discard the code candidates that the processor has not yet attempted to decode and instead would begin attempting to decode candidates in the subsequent image.

Figure 13:
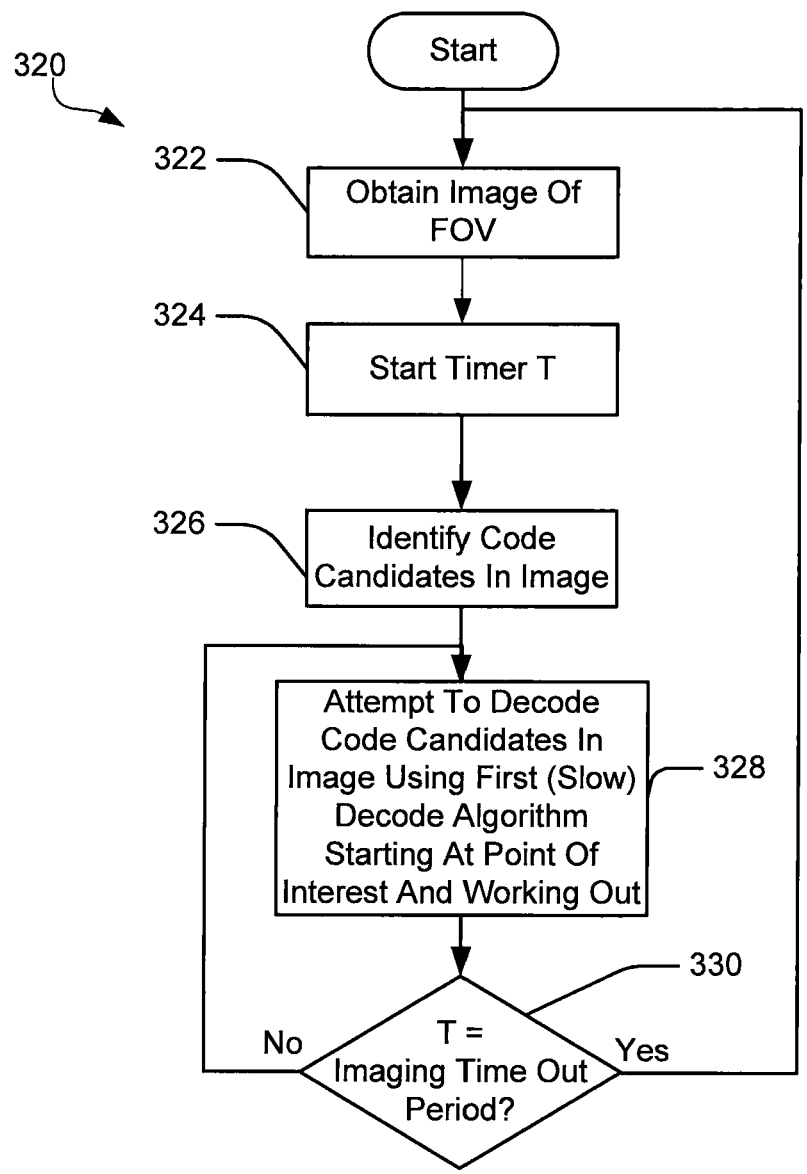
FIG. 13 is another process that may be performed by the processor of FIG. 2 to optimize decode processes.

Referring to FIG. 13, a process 320 whereby processor 108 uses an imaging timeout timer to control the decode process is illustrated. At block 322, the processor 108 obtains an image of the field of view from the camera 105. At block 324, processor 108 starts timer 109 (see again FIG. 2). At block 326, processor 108 identifies code candidates in the image. At block 328, processor 108 attempts to decode code candidates in the image using the first relatively expensive and slow decode algorithm starting at a point of interest (e.g., see point 240 in FIG. 9) and working out.

At block 330, processor 108 determines whether or not the imaging timeout period or threshold period has lapsed. Where the timeout period has not lapsed, control passes back up to block 328 where the processor continues to attempt to decode code candidates working outward from the point of interest. At block 330, once the imaging timeout period has lapsed, control passes back up to block 322 where processor 108 obtains a next image from camera 105.

According to another aspect that is consistent with at least some embodiments of the present invention, in at least some cases processor 108 may be programmed to attempt to decode code candidates within obtained images using a simple and relatively rapid decode algorithm first and to store the consecutive images for subsequent processing if a code is not successfully decoded within one of the images. Thus, for instance, processor 108 may be programmed to obtain a first image of a field of view, attempt to decode code candidates within the first image using a simple and rapid decode algorithm and to store the image for possible subsequent processing when no code is successfully decoded within the image. Next, the processor 108 may be programmed to obtain a second image of the field of view, perform the simple and rapid decode algorithm on code candidates in the second image and, if at least one code has not been successfully decoded in the second image, to store the second image for possible subsequent analysis. In at least one embodiment this process may continue for five consecutive images where each image is stored if at least one code has not been successfully decoded in the image. After the five images are stored, processor 108 may be programmed to re-access at least a subset of the stored images and attempt to decode code candidates in the subset of images using a relatively more expensive decode algorithm.

Figure 14:
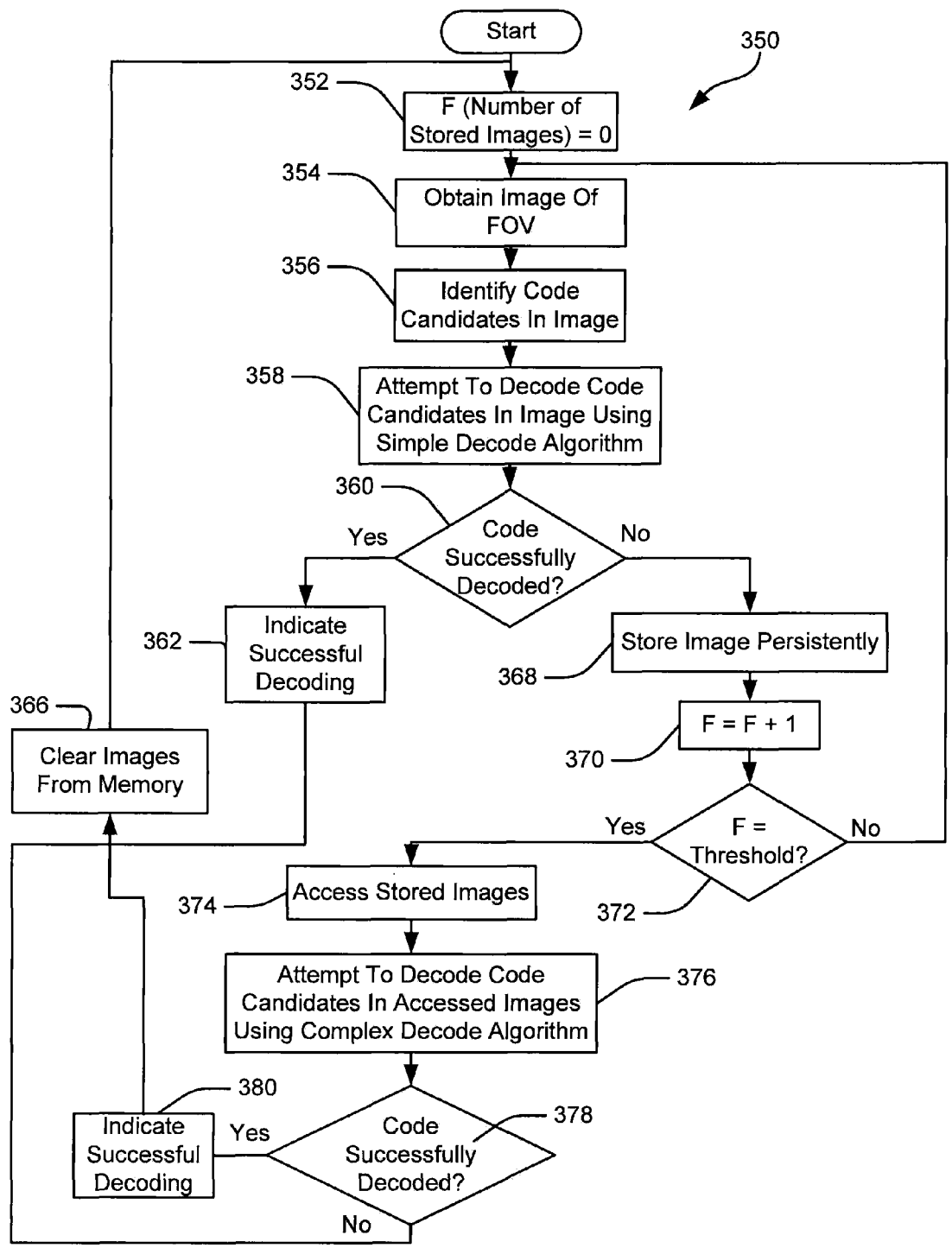
FIG. 14 is a process that may be performed by the processor of FIG. 2 whereby a series of consecutive images are first examined in an attempt to decode code candidates using a simple decode algorithm after which the series of images may be reexamined in an attempt to decode candidates using a relatively more complex decode algorithm.

Referring now to FIG. 14, a process 350 wherein processor 108 processes received images using a first decode algorithm and then subsequently processes those images using a second decode algorithm when decode attempts have been unsuccessful is illustrated. At block 352, processor 108 sets a counter F which represents the number of stored images to zero. At block 354, processor 108 obtains an image of the field of view. At block 356, processor 108 identifies code candidates in the image. At block 358, processor 108 attempts to decode code candidates in the image using a simple or relatively inexpensive decode algorithm.

At block 360 where the code candidates are not successfully decoded, control passes to block 368 where the image is stored in a persistent fashion (i.e., in a fashion that allows the image to be accessed subsequently for possible additional processing). At block 370, the image counter F is incremented by 1. At block 372, the image counter F is compared to a threshold value (e.g., 5). Where the image counter value F is not equal to the threshold value, control passes back up to block 354 where another image is obtained and the process continues. Where the image counter value F is equal to the threshold value, control passes from decision block 372 to process block 374. At block 374, the stored images are accessed. At block 376, processor 108 attempts to decode the code candidates in the accessed images using a relatively complex decode algorithm which requires additional time. After block 376, control passes to block 378.

Referring still to FIG. 14, at block 378, processor 108 determines whether or not a code in any of the images has been successfully decoded. Where a code has not been successfully decoded, control passes to block 366 where all of the images are cleared from memory after which control passes back up to block 352 where the image counter F is reset to zero. At block 378, where at least one code as been successfully decoded, control passes to block 380 where processor 108 indicates successful decoding via LED 132 and/or audio output 134. After block 380, control passes to block 366 where the images from the memory are cleared after which control passes back up to block 352 where the image counter F is reset to zero.

Referring once again to FIG. 14, at block 360, where processor 108 determine that a code has been successfully decoded, control passes to block 362 where the processor 108 indicates successful decode via LED 132 and/or audio output 134. After block 362, control passes to block 366 where images are cleared from the memory after which control passes back up to block 352 where the image counter F is reset to zero.

In at least some embodiments it is contemplated that, when a simple decode algorithm has been employed to attempt to decode candidates in an image and none of the decode attempts have been successful, a decode success factor may be assigned to the image or to separate code candidates within the image indicating how successful one or more of the decode attempts was with respect to the image. Then, after decode attempts corresponding to several images have been unsuccessful, when the images are re-accessed to attempt to decode using a more complex or expensive decode algorithm, processor 108 may be programmed to either attempt to decode only code candidates or candidates in images that have high success factors or the order in which the images or candidates are examined using the expensive decode algorithm may be a function of the success factors. To this end, referring to FIG. 15, a subprocess 400 that may be substituted for a portion of the process shown in FIG. 14 is illustrated. Referring also to FIG. 14, at block 360, when no decode attempt has been successful for candidates in an image, control may pass to block 402 in FIG. 15 where processor 108 identifies and stores a decode success factor for the image or separate success factors for each of a subset of the candidates in the image. At block 404, processor 108 stores the image in a persistent fashion and at block 406 processor 108 increments the image counter F by 1.

Continuing, at block 408, processor 108 determines whether or not the image counter F is equal to the threshold value. Where the image counter F is not equal to the threshold value, control passes back to block 354 in FIG. 14.

Figure 15:
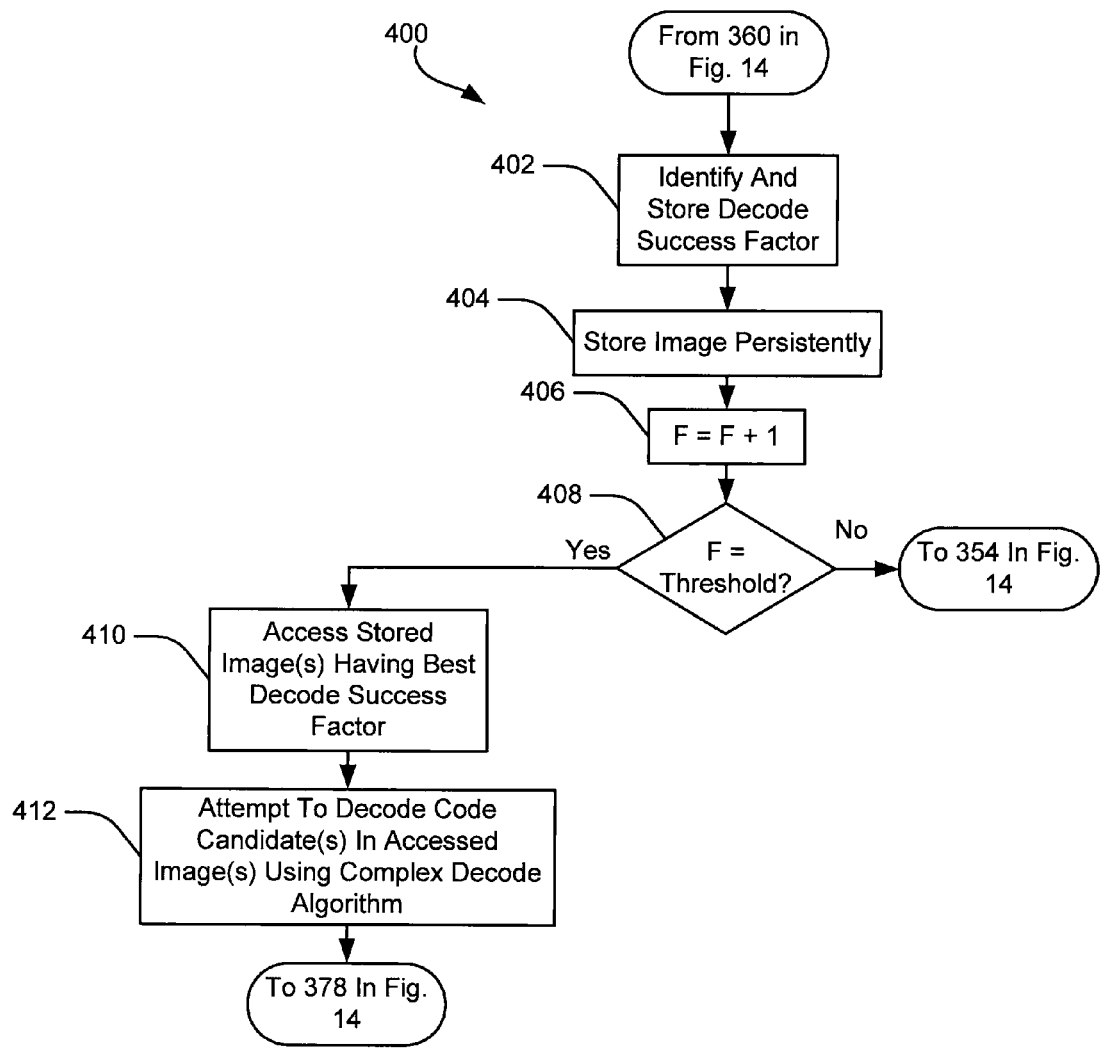
FIG. 15 is a flow chart illustrating a subprocess that may be substituted for a portion of the process shown in FIG. 14 whereby success factors are assigned to images and are used subsequently to identify a subset of the images or an image order to be used during a subsequent decode processes.

Referring still to FIG. 15, at block 408, where the image counter F is equal to the threshold value, control passes to block 410 where processor 108 accesses one or more of the stored images that have the best decode success factor or factors or accesses the code candidates in the images that have the best decode success factors. At block 412, processor 108 attempts to decode code candidates having the best decode success factors or to decode code candidates in the accessed images using the more complex decode algorithm. After block 412, control passes back up to block 378 in FIG. 14.

In still other embodiments, when images are re-accessed, code candidates in one or a sub-set of images may be processed using an expensive algorithm based on locations within the images. For instance, in some cases, processor 108 may only process candidates within and expensive ROI or within a threshold distance of a point, a line or some other geometric shape or may only process a specific number of code candidates closest to a geometric shape using the expensive algorithm.

In at least some cases, while different decoding algorithms are performed for different regions of interest, the different regions of interest may be completely separate regions that do not overlap or may overlap at least somewhat.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

As described above, in at least some embodiments the term "decode" is used to refer to a process of extracting salient features from code candidates after those candidates have been identified and then logically decoding the extracted features by mathematically interpreting the features to extract encoded data where the code candidates are identified by some other process. In other embodiments it also makes sense to use algorithms that have different relative expenses to identify code candidates in an image where the algorithms selected to identify code candidates are based on location or image ROI. For instance, referring again to FIG. 3, in some embodiments relatively expensive algorithms may be used to each of locate code candidates, extract features and logically decode in central ROI 150 while less expensive algorithms are used to perform the same functions in the peripheral region 210. Thus, each of the embodiments described above may be modified by including the step of identifying code candidates in the decode algorithm so that location dependent algorithms of different expenses are employed for the entire candidate identifying, extracting and logical decoding processes.

In addition, in at least some cases where decoding algorithms include the candidate identifying process, it may be that the candidate identifying processes have different relative expenses but that other portions of the decoding algorithms are identical or substantially similar. For instance, referring again to FIG. 3, the candidate identifying portion of the decoding process may be relatively expensive for central ROI 150 when compared to peripheral ROI 210, but the extracting and logical decoding portions of the algorithm may be identical.

Thus, the invention is to cover all modifications, equivalents, and alternatives falling within the spirit and scope of the invention as defined by the following appended claims.

What is claimed is:

1. A method for decoding codes applied to objects for use with an image sensor that includes a two dimensional field of view (FOV), the method comprising the steps of:
   a) selecting, using a processor, a first decode algorithm for attempting to decode within a first defined region of interest (ROI) in the FOV and a second decode algorithm for attempting to decode within a second defined ROI in the FOV and outside the first defined ROI in the FOV, the first defined ROI having a first ROI boundary and the second defined ROI having a second ROI boundary that is different than the first ROI boundary, the first decode algorithm and second decode algorithm are different;
   b) subsequent to step a), obtaining, using the processor, an image of the FOV, the image including a first code candidate located in the first defined ROI or the second defined ROI; and
   c) attempting, using the processor, to decode the first code candidate when located in the first defined ROI using the first decode algorithm and attempting, using the processor, to decode the first code candidate when located in the second defined ROI and outside the first defined ROI using the second decode algorithm.

2. The method of claim 1 wherein the step of attempting to decode the at least one code candidate in the image of the FOV includes at least one of identifying the at least one code candidate in the first defined ROI and identifying the at least one code candidate in the second defined ROI.

3. The method of claim 1 wherein the first decode algorithm is computationally more complex than the second decode algorithm.

4. The method of claim 3 wherein the first defined ROI includes a central portion of the image of the FOV.

5. The method of claim 4 wherein the second defined ROI includes portions of the image of the FOV surrounding the first defined ROI.

6. The method of claim 1 wherein the first decode algorithm requires a greater amount of time to complete than the second decode algorithm.

7. The method of claim 1 wherein the first decode algorithm includes the second decode algorithm and an additional decode algorithm.

8. The method of claim 1 wherein the first defined ROI includes an ROI corresponding to the location of a successfully decoded code in a prior image.

9. The method of claim 1, wherein step a) further comprises selecting, using the processor, a third decode algorithm for attempting to decode within a third defined ROI in the FOV and outside the first defined ROI and second defined ROI in the FOV, the third defined ROI having a third ROI boundary which is different than the first and second ROI boundaries, the third decode algorithm is different than the first decode algorithm and the second decode algorithm, the method further comprising: e) attempting, using the processor, to decode an additional code candidate when located in the third defined ROI and outside the first ROI and the second ROI using the third decode algorithm.

10. The method of claim 1 further including the steps of receiving an indication from an individual indicating the first defined ROI.

11. The method of claim 1 wherein the first defined ROI includes a position within the image of the FOV and a distance relative to the position.

12. The method of claim 11 wherein the position consists of a location along a single axis within the image of the FOV.

13. The method of claim 1 wherein the image sensor forms part of a portable code reading device.

14. The method of claim 1 wherein the image sensor forms part of a hand held code reading device.

15. The method of claim 1 wherein the image sensor obtains images in a repetitive fashion and wherein a size of the first defined ROI is determined at least in part as a function of the time required to attempt to decode code candidates in the first defined ROI in a prior obtained image.

16. The method of claim 1 wherein the image sensor obtains images in a repetitive fashion and wherein the second decode algorithm is selected at least in part as a function of the time required to attempt to decode code candidates in a prior obtained image.

17. A method for decoding codes applied to objects for use with an image sensor that includes a two dimensional field of view (FOV), the method comprising the steps of:
   a) selecting, using a processor, at least one of different decode algorithms for attempting to decode within at least one of different defined regions of interest (ROIs) in the FOV;
   b) subsequent to step a), obtaining, using the processor, an image of the FOV, the image include a code candidate located in the at least one of different defined ROIs; and
   c) applying, using the processor, the at least one of different decode algorithms to the code candidate to attempt to decode the code candidate when located in the at least one of different defined ROIs.

18. The method of claim 17 wherein the step of applying the at least one of different decode algorithms includes identifying the code candidate in the image of the FOV.

19. The method of claim 17 wherein a first decode algorithm is applied to the code candidate when located within a first defined region of interest (ROI) and a second decode algorithm that is different than the first decode algorithm is applied to the code candidate when located within a second defined ROI that is different than the first defined ROI.

20. The method of claim 19 wherein the first defined ROI includes a central portion of the image of the FOV and the second defined ROI includes portions of the image of the FOV that surround the first defined ROI.

21. The method of claim 17 wherein the image sensor forms part of a hand held device.

22. The method of claim 17, the method further comprising repeating steps a), b), and c), wherein the selecting of step a) changes to optimize the decode process.

23. The method of claim 22 wherein the decode algorithms include at least a first relatively complex decode algorithm and a second relative simple decode algorithm, and wherein the selecting of step a) changes to alter the ratio of code candidates to which the first and second decode algorithms are applied.

24. The method of claim 23 wherein the ratio is altered as a function of the time required to attempt to decode code candidates in the image of the FOV using the first and second decode algorithms.

25. An apparatus for reading codes applied to objects, the apparatus comprising:
an image sensor that includes a two dimensional field of view (FOV);
a processor linkable to the sensor to obtain image data there from, the processor programmed to perform the steps of:
a) selecting a first decode algorithm to be used for attempting to decode within a first defined region of interest (ROI) in the FOV and a second decode algorithm to be used for attempting to decode within a second defined ROI in the FOV and outside the first defined ROI in the FOV, the first defined ROI having a first ROI boundary and the second defined ROI having a second ROI boundary that is different than the first ROI boundary, the first decode algorithm and second decode algorithm are different;
b) subsequent to step a), obtaining an image of the FOV, the image including a first code candidate located in the first defined ROI or the second defined ROI;
c) attempting to decode the first code candidate when located in the first defined ROI using the first decode algorithm and attempting to decode the first code candidate when located in the second defined ROI and outside the first defined ROI using the second decode algorithm.

26. The apparatus of claim 25 wherein the first decode algorithm is computationally more complex than the second decode algorithm.

27. The apparatus of claim 26 wherein the first defined ROI includes a central portion of the image of the FOV.

28. The apparatus of claim 25 wherein the first decode algorithm requires a greater amount of time to complete than the second decode algorithm.

29. An apparatus for decoding codes applied to objects, the apparatus comprising:
an image sensor including a two dimensional field of view (FOV);
a processor linkable to the image sensor and programmed to perform the steps of:
a) selecting at least one of different decode algorithms for attempting to decode within at least one of different defined regions of interest (ROIs) in the FOV;
b) subsequent to step a), obtaining an image of the FOV, the image including a code candidate located in the at least one of different defined ROIs and
applying at least one of different decode algorithms to the code candidate to attempt to decode the code candidate when located in the at least one of different defined ROIs.

30. The apparatus of claim 29 wherein a first decode algorithm is applied to code candidates when located within a first defined region of interest (ROI) and a second decode algorithm that is different than the first decode algorithm is applied to code candidates when located within a second defined ROI that is different than the first ROI.

* * * * *